US005631088A

United States Patent [19]

Harper

[11] Patent Number: 5,631,088

[45] Date of Patent: May 20, 1997

[54] WINDOWS AND METHODS OF MAKING AND INSTALLING WINDOWS

[76] Inventor: Ross Harper, 301 - 1135 Quayside Drive, New Westminster, B.C., Canada, V3M 6J4

[21] Appl. No.: 298,385

[22] Filed: Aug. 30, 1994

[51] Int. Cl.[6] .................. B32B 9/00

[52] U.S. Cl. .................. 428/426; 428/122; 428/158; 428/160; 428/161; 428/358; 428/437; 428/458; 52/98; 52/203; 52/208; 52/309.4; 49/125; 49/161; 49/404; 49/431

[58] Field of Search .................. 428/160, 161, 428/158, 458, 426, 122, 358, 437; 52/474, 404, 309.4, 98, 208, 203; 49/161, 125, 404, 431, 501

[56] References Cited

U.S. PATENT DOCUMENTS

| | | | |
|---|---|---|---|
| 2,188,050 | 1/1940 | Kuyper | 189/75 |
| 2,863,534 | 12/1958 | Gillespie | 189/75 |
| 3,147,336 | 9/1964 | Mathews | 174/35 |
| 3,786,609 | 1/1974 | Difazio | 52/619 |
| 4,265,067 | 5/1981 | Palmer | 52/309 |
| 4,433,517 | 2/1984 | Moore, Jr. | 52/204 |
| 4,550,540 | 11/1985 | Thorn | 52/309 |
| 4,642,955 | 2/1987 | Webb | 52/204 |
| 4,643,787 | 2/1987 | Goodman | 156/196 |
| 4,730,429 | 3/1988 | Roberts | 52/309 |

*Primary Examiner*—Patrick Ryan
*Assistant Examiner*—Abraham Bahta
*Attorney, Agent, or Firm*—Hughes, Multer & Schacht, P.S.

[57] ABSTRACT

A material used to fabricate sashes used by window assemblies. The material comprises a foam core covered by a cladding material. The foam core acts as a filler and provides insulation, while the cladding material protects the foam core from the environment and physical abuse. Often, a structural assembly or member is provided to stiffen the sash material. The cladding and structural assembly are placed into a mold and resin is injected into the mold between the cladding and the structural assembly. The resin cures to form the foam core. The foam core bonds the cladding and structural assembly together to form the sash material. The sash material is cut with woodworking tools to form a sash for a window assembly. The cladding is configured such that, when the window assembly is installed in a wall, interior vapor barrier material and exterior air barrier material applied to the wall overlap with the cladding material to reduce air flow through the wall around the window assembly.

14 Claims, 5 Drawing Sheets

WINDOWS AND METHODS OF MAKING AND INSTALLING WINDOWS

TECHNICAL FIELD

The present invention relates to windows, and, more particularly, to the material from which window sashes are fabricated, to methods of fabricating such sash material, and to methods of installing windows constructed with such sash material.

BACKGROUND OF THE INVENTION

Windows are conventionally formed by inserting a window assembly into an opening in a wall. The window assembly basically comprises window panes and a sash in which the panes are mounted.

Numerous materials and combinations of materials have been employed to form window sashes. Wood has long been a desirable material for fabricating window sashes; wood is aesthetically pleasing and, being a good insulator, is warm to the touch. However, wood has become quite expensive and is too costly for many window installations. Further, it is difficult to seal the juncture between a wood window assembly and the wall surrounding the opening in which the window assembly is mounted.

Aluminum has also been commonly used as a sash material. Window assemblies using aluminum sashes are relatively inexpensive; however, aluminum sashes have undesirable thermal properties and, under certain weather conditions, "sweat," resulting in moisture accumulating on the inside of the sash.

Extruded polyvinyl chloride (PVC) is also commonly used as a sash material. Extruded PVC sashes are nearly as inexpensive as aluminum sashes and do not sweat like aluminum sashes. However, PVC sashes also have undesirable thermal properties: they are poor insulators and are cool to the touch.

Wood clad with PVC has also been used as a sash material. This product has many of the aesthetic and insulating qualities of an entirely wood sash, and the PVC cladding protects the wood, thereby reducing the long term maintenance costs of the product. However, PVC clad wood sashes are expensive and are still difficult to seal against unwanted air flowing between the window assembly and the frame defining the opening.

Sashes are also made of pultruded fiberglass. Pultruded fiberglass sashes have better thermal characteristics than PVC sashes but not as good as wood or PVC clad wood sashes. Pultruded fiberglass sashes are also expensive and tend to be cool to the touch.

PRIOR ART

The following U.S. Patents were uncovered during a professional patentability search conducted on behalf of the Applicant: (a) U.S. Pat. No. 3,147,336 issued Sep. 1, 1964 to Mathews; (b) U.S. Pat. No. 3,786,609 issued Jan. 22, 1974 to Difazio; (c) U.S. Pat. No. 4,265,067 issued May 5, 1981 to Palmer; (d) U.S. Pat. No. 4,550,540 issued Nov. 5, 1985 to Thorn; (e) U.S. Pat. No. 4,643,787 issued Feb. 17, 1987 to Goodman; (f) U.S. Pat. No. 2,188,050 issued Jan. 23, 1940 to Kayper; (g) U.S. Pat. No. 2,863,534 issued Dec. 9, 1958 to Gillespie; (h) U.S. Pat. No. 4,433,517 issued Feb. 28, 1984 to Moore, Jr.; (i) U.S. Pat. No. 4,642,955 issued Feb. 17, 1987 to Webb; and (j) U.S. Pat. No. 4,730,429 issued Mar. 15, 1988 to Roberts.

Of the foregoing patents, only the Kuyper patent, the Gillespie patent, the Moore, Jr. patent, the Webb patent, and the Robert patents relate to window assemblies. The Kuyper patent discloses a wood/metal sash. The Gillespie patent discloses a metal sash. The Roberts patent discloses a sash comprising vinyl clad wood. The Moore, Jr. patent discloses a sash material comprising a rigid molded plastic assembly filled with fiberglass insulation. The Webb patent discloses a window assembly in which the sash, frame, and trim are formed of injection molded urethane. The sash is supported by a metal stiffener.

The Mathews patent, the Difazio patent, the Palmer patent, the Thorn patent, and the Goodman patent all relate to solid doors or panels having a foam core covered by a protective and/or decorative skin of metal, wood, vinyl, or fiberglass.

OBJECTS OF THE INVENTION

In view of the foregoing, it is apparent that an important object of the present invention is to provide improved sash material for window assemblies, methods of manufacturing sash material, and methods of installing window assemblies.

Another important, but more specific, object of the present invention is to provide window assemblies having a favorable mix of the following factors:

a. warm to the touch;
b. aesthetically pleasing;
c. good thermal characteristics;
d. inexpensive to manufacture and install;
e. low maintenance costs;
f. easily installed; and
g. easily sealed.

SUMMARY OF THE INVENTION

These and other objects are achieved by the present invention, which is a window assembly having a transparent pane held in a sash comprising a foam core covered by a cladding material. The sash material also preferably comprises a structural assembly to stiffen the sash. The cladding material is placed into a mold with the structural assembly. Resin is injected into the mold between the cladding material and the structural assembly. When the resin cures, it forms the foam core and bonds the cladding material and structural assembly together into the sash material. The sash material is then cut and assembled into the sash in which the transparent pane is mounted.

The cladding material is preferably formed of extruded poly-vinyl chloride, although pultruded fiberglass reinforced plastic may also be used. The structural assembly is preferably formed of several pieces of oriented-strand board glued together. The sash material formed from these components can be cut and fastened together like wood.

The cladding material is configured such that, when the window is installed in an opening in a wall: (a) an interior portion of the cladding material is flush with the interior finish material; (b) an exterior portion thereof is arranged adjacent to the sheathing on the exterior side of the wall; and (c) the sash structural component is arranged adjacent to the sill member of the structural framing defining the opening in which the window assembly is mounted. A vapor barrier applied on the interior side of the wall is sized to overlap with the interior portion of the cladding, and an air barrier applied over the exterior sheathing is sized to overlap with the exterior portion of the clad structural component. This arrangement substantially prevents air from flowing through the wall opening between the window assembly and the wall.

DETAILED DESCRIPTION OF THE INVENTION

Figure 1:
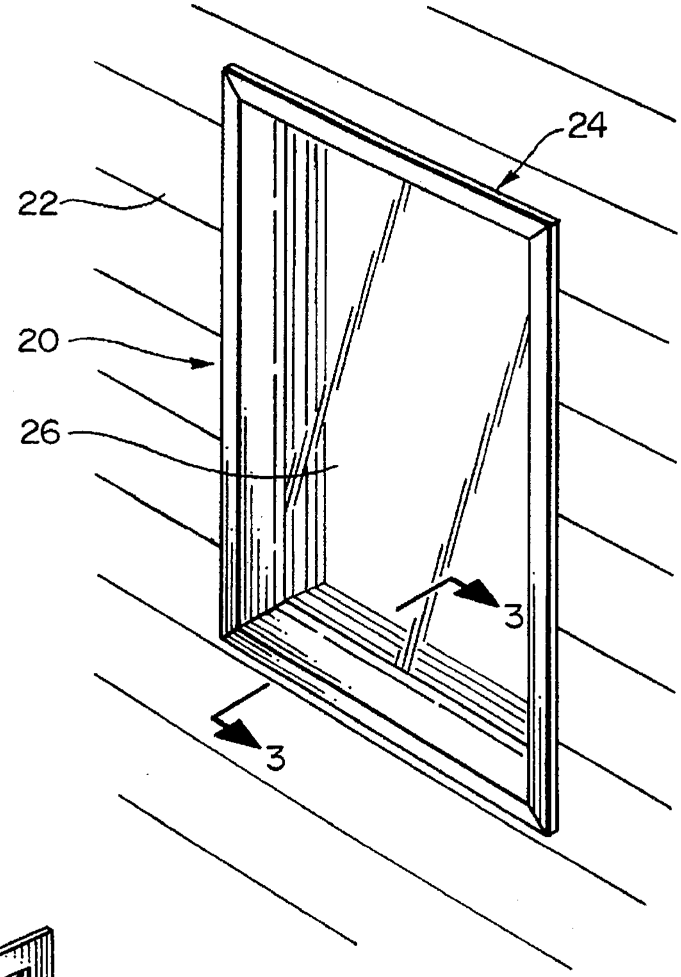
FIG. 1 is perspective view showing an exterior side of a wall incorporating a window assembly constructed in accordance with, and embodying, the principles of the present invention.
Figure 2:
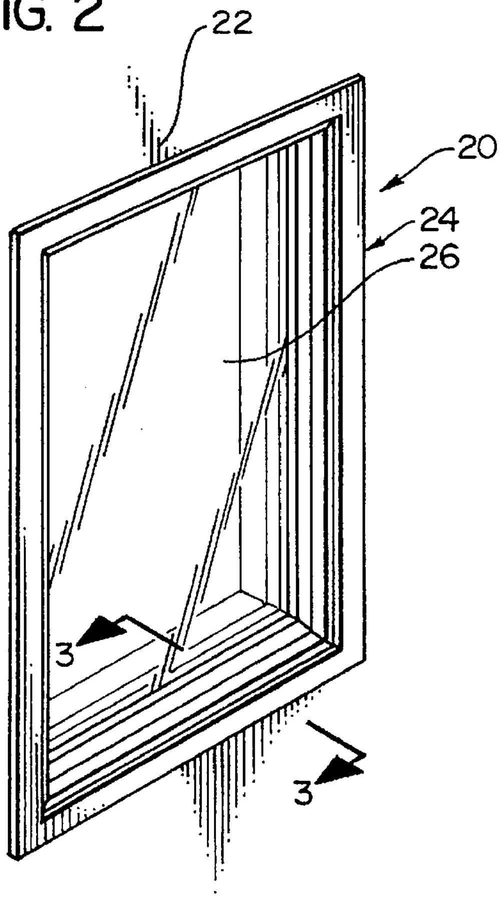
FIG. 2 is a perspective view showing an interior side of a wall incorporating the window assembly depicted in FIG. 1.

Turning now to the drawing, depicted at 20 in FIGS. 1 and 2 thereof is a window assembly constructed in accordance with, and embodying, the principles of the present invention. This window assembly 20 is mounted in a wall 22 and basically comprises a sash 24 and a transparent pane of glass 26.

Figure 3:
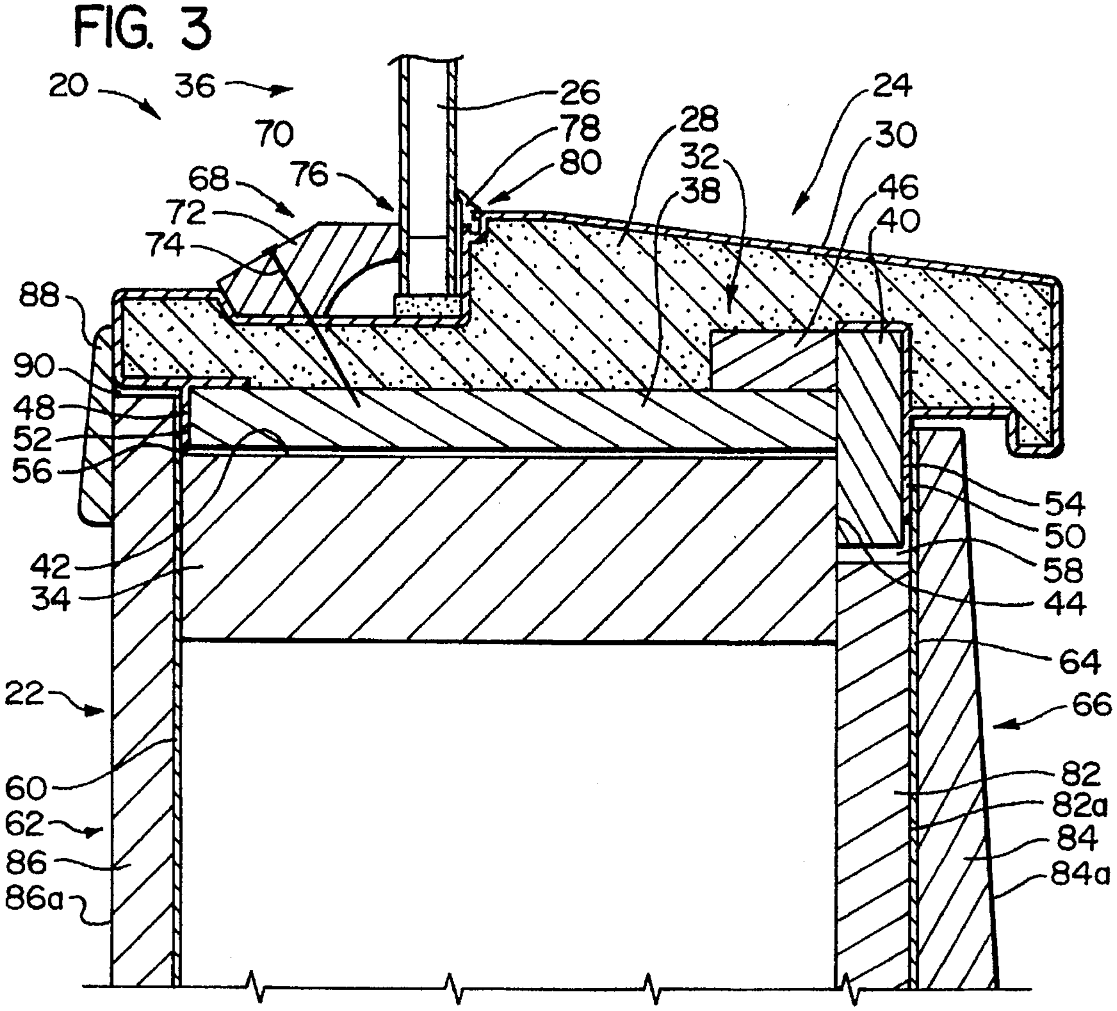
FIG. 3 is a cut-away view of the window assembly taken along lines 3—3 in FIGS. 1 and 2.

As depicted in FIG. 3, the sash 24 basically comprises an insulating foam core 28 and a cladding 30. The foam core 28 is an excellent insulator that prevents sweating and keeps the sash 24 warm to the touch. The cladding 30 protects the foam core 28 from the weather and from becoming physically damaged. The exemplary sash 24 further comprises a structural assembly 32. The structural assembly 32 stiffens the sash 24.

The cladding 30 and structural assembly 32 are inexpensive and easily fabricated. The foam core 28 is also inexpensive and can be easily and inexpensively injected into a mold containing the cladding 30 and structural assembly 32 to obtain the sash 24. The resulting sash 24 is at least as aesthetically pleasing as a conventional vinyl or vinyl clad sash, and its appearance can be improved by using wood moldings to cover part or all of the exposed vinyl cladding.

The details of construction, installation, and fabrication of the window assembly 20 of the present invention will now be described in further detail with reference to FIGS. 3–8. In the following discussion, the terms "inner" and "outer" refer to directions away from and towards, respectively, the center of a given object (usually the window assembly 20). The terms "exterior" and "interior" refer to directions or objects towards the outside and inside, respectively, of the structure incorporating the wall 22.

Referring again to FIG. 3, that figure further shows that the wall 22 will often comprise a frame member such as a sill member 34 that defines the lower peripheral edge of an opening 36 in which the window assembly 20 is mounted. The side and top peripheral edges of the opening 36 are similarly defined by other frame members (not shown). With the exemplary window assembly 20, the structural assembly 32 engages the sill member 34 and the other frame members that define the opening 36.

In particular, the exemplary structural assembly 32 comprises a horizontal rigid member 38 and a vertical rigid member 40. An inner surface 42 of the sill member 34 supports the horizontal member 38 and thus supports the window assembly 20. The vertical member 40 is securely attached to the horizontal member 38 such that the vertical member 40 downwardly extends over an exterior surface 44 of the sill member 34. As will be described in further detail below, this arrangement of rigid members 38 and 40 allows the window assembly 20 to be inserted into the opening 36 from the exterior. Another rigid member 46 is attached to the members 38 and 40 to provide additional rigidity to the structural assembly 32.

The cladding 30 comprises an interior vertical portion 48 and an exterior vertical portion 50. The interior vertical portion 48 extends over an interior surface 52 of the horizontal rigid member 38 while the exterior vertical portion 50 extends over an exterior surface 54 of the vertical rigid member 40.

When the window assembly 20 is installed, the interior and exterior vertical portions 48 and 50 provided as just-described are adjacent to an interior gap 56 and an exterior gap 58 that occur between the window assembly 20 and the wall 22. If these gaps 56 and 58 are not sealed, air can flow through the opening 36 around the window assembly 20. To prevent air flow through the gaps 56 and 58, a vapor barrier 60 is formed on an interior side 62 of the wall 20 such that the vapor barrier overlaps the interior vertical portion 48; further, an air barrier 64 is formed on an exterior side 66 of the wall 22 such that the air barrier 64 overlaps the exterior vertical portion 50. Therefore, the vertical portions 48 and 50 seal the gaps 56 and 58 to prevent air flow through the opening 36 around the window assembly 20.

FIG. 3 also shows that a groove 68 is formed on an inner surface of the sash 24. This groove 68 receives an edge 70 of the glass pane 26. A sash molding 72 is fixed in the groove 68 by a nail 74 to hold the glass pane 26 in place within the groove 68.

A foam block 76 is arranged within the groove 68 to engage the glass pane 26; this block 76 compresses and expands to accommodate thermal expansion and contraction of the glass pane 26.

A projection 78 is integrally formed with the cladding 30 along an exterior edge 80 of the groove 68. When the glass pane 26 is held in the groove 68 by the molding 72 shown in FIG. 3, the glass pane 26 so contacts and distorts the projection 78 that the projection 78 creates a fluid tight seal between the glass pane 26 and the sash 24.

As described above and shown in more detail in FIG. 8, the sash 24 formed by the foam core 28, cladding 30, and structural assembly 32 has a cross-sectional perimeter as defined by the following table A:

TABLE A

| SURFACE | PREFERRED LENGTH | PREFERRED RANGE |
|---|---|---|
| first interior surface 24a | 0.5 | 0.375–0.75 |
| first outer surface 24b | 0.5 | 0.4375–0.5625 |
| second interior surface 24c | 0.75 | 0.5–1.25 |
| first inner surface 24d | 0.875 | 0.5–2.75 |
| beveled surface 24e | 0.35 | 0.25–0.53 |
| second inner surface 24f | 2.0 | 1.5–2.5 |
| third interior surface 24g | 1.0 | 0.75–1.25 |
| third inner surface 24h | 5.0 | 3.0–5.0 |
| first exterior surface 24i | 1.5 | 1.125–2.0 |

TABLE A-continued

| SURFACE | PREFERRED LENGTH | PREFERRED RANGE |
|---|---|---|
| second exterior surface 24j | 0.375 | 0.375–0.625 |
| fourth interior surface 24k | 0.375 | 0.125–0.5 |
| third outer surface 24l | 1.5 | 0.75–2.0 |
| second exterior surface 24m | 0.75 | 0.75–1.25 |
| fourth outer surface 24n | 0.4375 | 0.375–0.5625 |
| fifth interior surface 24o | 0.75 | 0.625–1.5 |
| fifth outer surface 24p | 5.25 | 2.5–5.25 |

The dimensions in Table A refer to the lengths of the various surfaces along the cross-sectional perimeter of the sash 24 and are in inches.

The weather sealing projection 78 described above extends along the juncture of the third interior surface 24*g* and the third inner surface 24*h*.

In the exemplary window assembly 20, the surfaces 24*a*, 24*c*, 24*g*, 24*i*, 24*k*, 24*m*, and 24*o* are generally parallel to the glass pane 26 and the wall 22, while the surfaces 24*b*, 24*d*, 24*f*, 24*j*, 24*l*, 24*n*, and 24*p* are generally orthogonal to the pane 26 and the wall 22. The bevelled surface 24*e* and third inner surface 24*h* are slanted with respect to the pane 26 and wall 22.

As is apparent in FIG. 3, the configuration and dimensions of the surfaces 24*a* and 24*b* are such that an interior surface 86*a* of the sheetrock 86 on the interior side 62 of the wall 22 is substantially co-planar with the the second interior surface 24*c* on the sash 24. The interior molding can thus be easily applied across the space 90 between the sheetrock 86 and the sash 24.

Similarly, the dimensions and arrangement of the surfaces 24*n* and 24*o* on the sash 24 are such that an exterior surface 82*a* on the sheathing 82 is substantially co-planar with the second exterior surface 24*m* on the sash 24. Further, the dimensions and arrangement of the surfaces 24*l*, 24*k*, and 24*j* are such that the various types of siding such as the clapboard siding 84 can easily be applied underneath the sash 24. Water will thus drip off the sash 24 onto an exterior surface 84*a* of the siding 84 as desired.

The dimensions and arrangement of the sash surfaces 24*e*, 24*f*, and 24*g* are determined by the thickness of the glass pane 26 and the shape and dimensions of the sash molding 72 employed to keep the glass pane 26 within the sash 24. The surface 24*e* is canted towards the interior side of the wall to allow the sash molding 72 to be placed into the groove 68 yet still brace the sash molding 72 against the glass pane 26.

The exact dimensions and shapes of the sash surfaces 24*d* and 24*h* are somewhat arbitrary and may be dictated in large part by aesthetic considerations.

Referring now for a moment to the wall 22, as will be described in further detail below, FIG. 3 shows that the exemplary wall 22 is conventionally stud framed, and the exterior side 66 thereof comprises an exterior sheathing 82 of plywood, oriented-strand board, or particle board. The air barrier 64 described above is stapled or nailed to the sheathing 82, and siding material such as clapboards 84 are nailed over the air barrier 64. The interior side of the wall 22 is formed by sheetrock 86 applied over the vapor barrier 60. Interior molding 88 is applied over the sheetrock 86 and the sash 24 to hide a space 90 therebetween.

Figure 4:
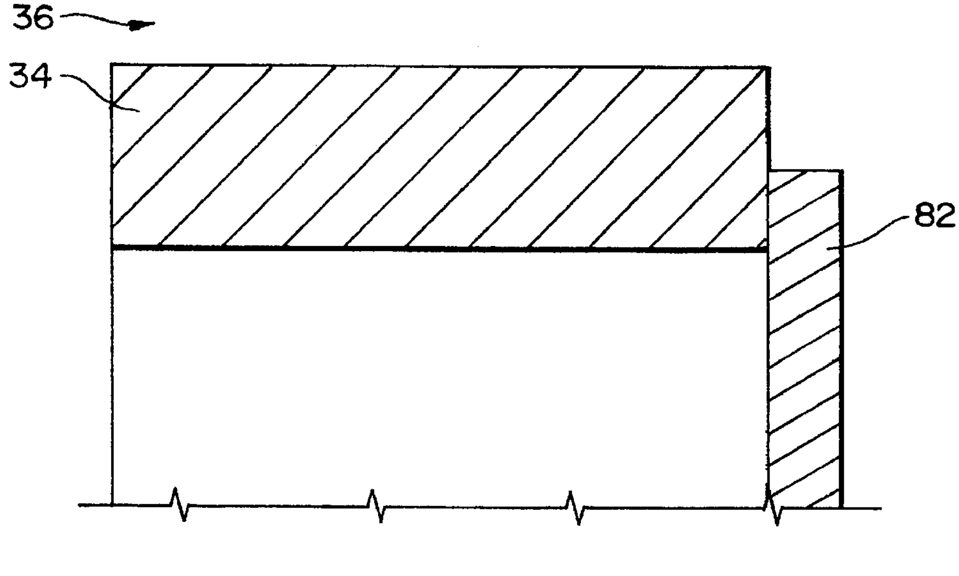
FIG. 4 shows a first step of a method of fabricating a wall containing the window assembly shown in FIG. 1.

Referring now to FIGS. 3–6, the method of installing the window assembly 20 will be described in further detail. As shown in FIG. 4, a stud frame comprising the sill member 34 is initially erected and the sheathing 82 applied thereto; the sheathing 82 is either not applied over or is removed to reveal the opening 36.

Figure 5:
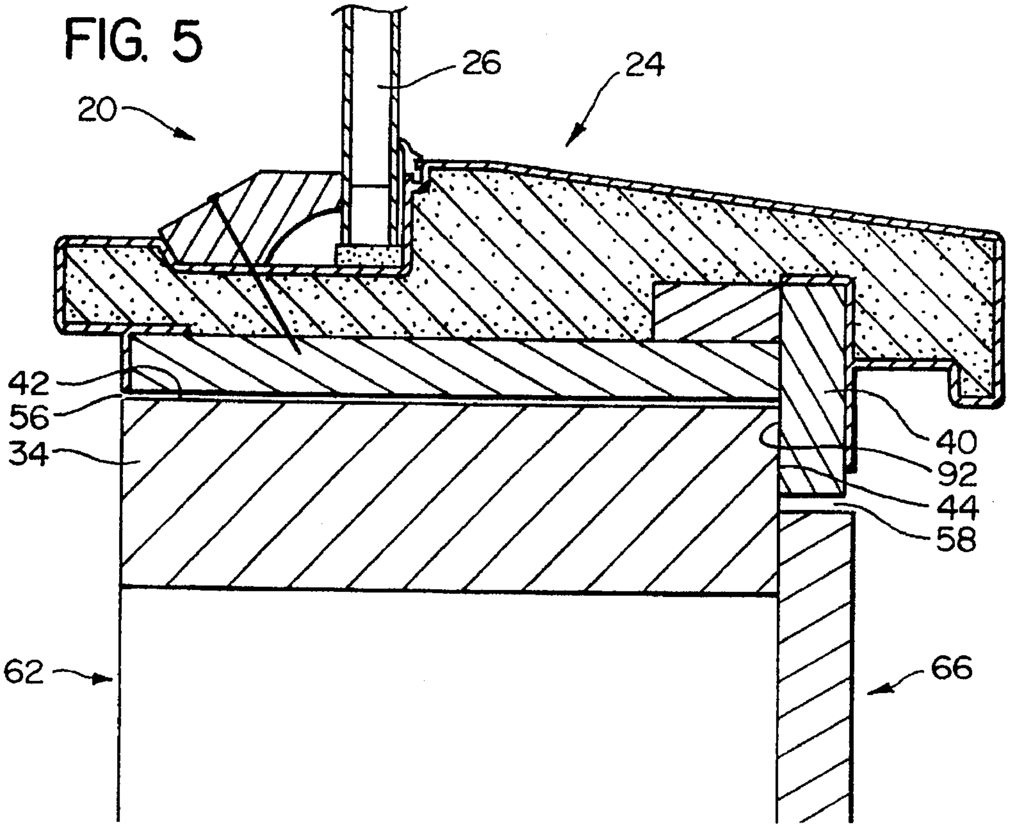
FIG. 5 shows a second step of a method of fabricating a wall containing the window assembly shown in FIG. 1.

As shown in FIG. 5, the window assembly 20 is next inserted into the opening 36 from the exterior side 66 of the wall such that the upper surface 42 of the sill member 34 supports the window assembly 20 and the interior side 92 of the vertical rigid member 40 engages the exterior side 44 of the sill member 34. Shims (not shown) may be inserted between the sill member 34 and the window assembly 20 to square up the window assembly. The window assembly 20 and the sill member 34 may be spaced from each other by as much as 5/16", FIG. 5 clearly shows the interior and exterior gaps 56 and 58 that, if not sealed, allow passage of air between the interior side 62 and exterior side 64 of the wall 22.

Figure 6:
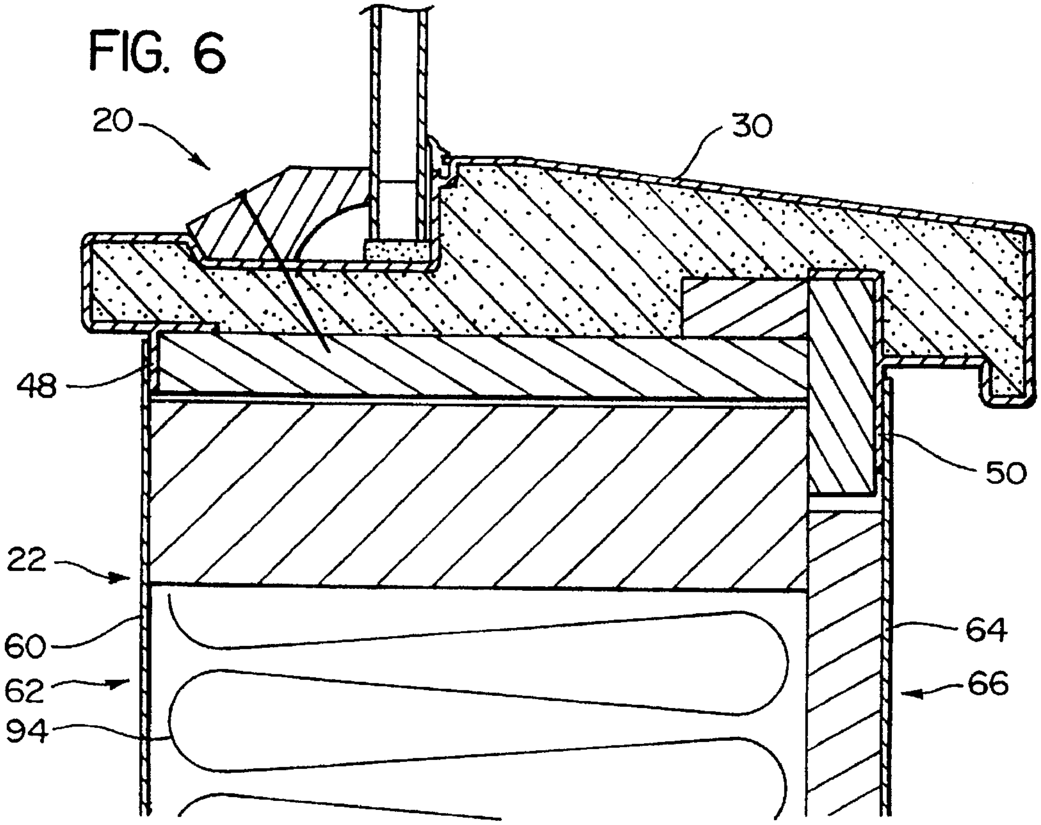
FIG. 6 shows a third step of a method of fabricating a wall containing the window assembly shown in FIG. 1.

Referring now to FIG. 6, it can be seen that the air barrier 64 is applied on the exterior side 66 of the wall 22. Material suitable for the air barrier 64 is available under the trade name TYVEK. The insulation 94 such as widely available fiberglass insulation is placed in the wall 22 between the studs thereof. The vapor barrier 60 is applied on the interior side 62 of the wall 22 over the insulation 94. Suitable vapor barrier 60 is widely available and is made of polyethylene.

The barriers 60 and 64 are stapled along their peripheral edges to the frame and/or the sheathing in a conventional manner. As discussed above, the vapor barrier 60 overlaps and is stapled to the interior vertical portion 48 of the cladding 30, and the air barrier 64 overlaps and is stapled to the exterior vertical portion 50 of the cladding 30.

The overlap of the barriers 60 and 64 with the cladding 30 substantially prevents passage of air between the wall 22 and the window assembly 20. This overlap should be at least 3/8" and is preferably approximately 5/8". The stapling of the vapor barrier and air barrier also reinforces the bond between the cladding 30 and the structural elements of the sash material 24.

FIG. 3 depicts the wall 22 after the final step of applying the exterior siding 84, sheetrock 86, and interior molding 88 to finish the wall 22.

Figure 7:
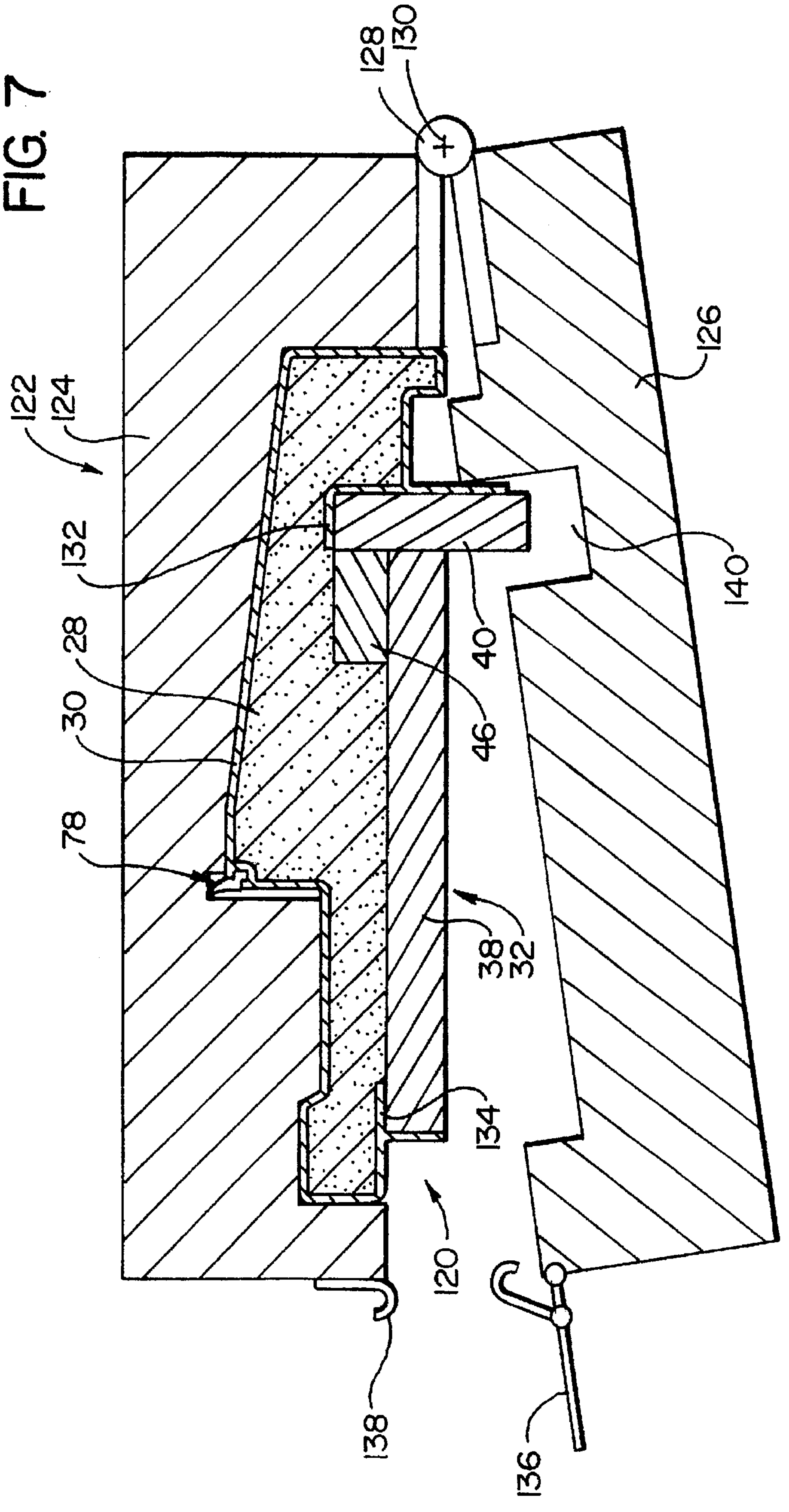
FIG. 7 shows a mold assembly for making sash material incorporated in the window assembly shown in FIG. 1.
Figure 8:
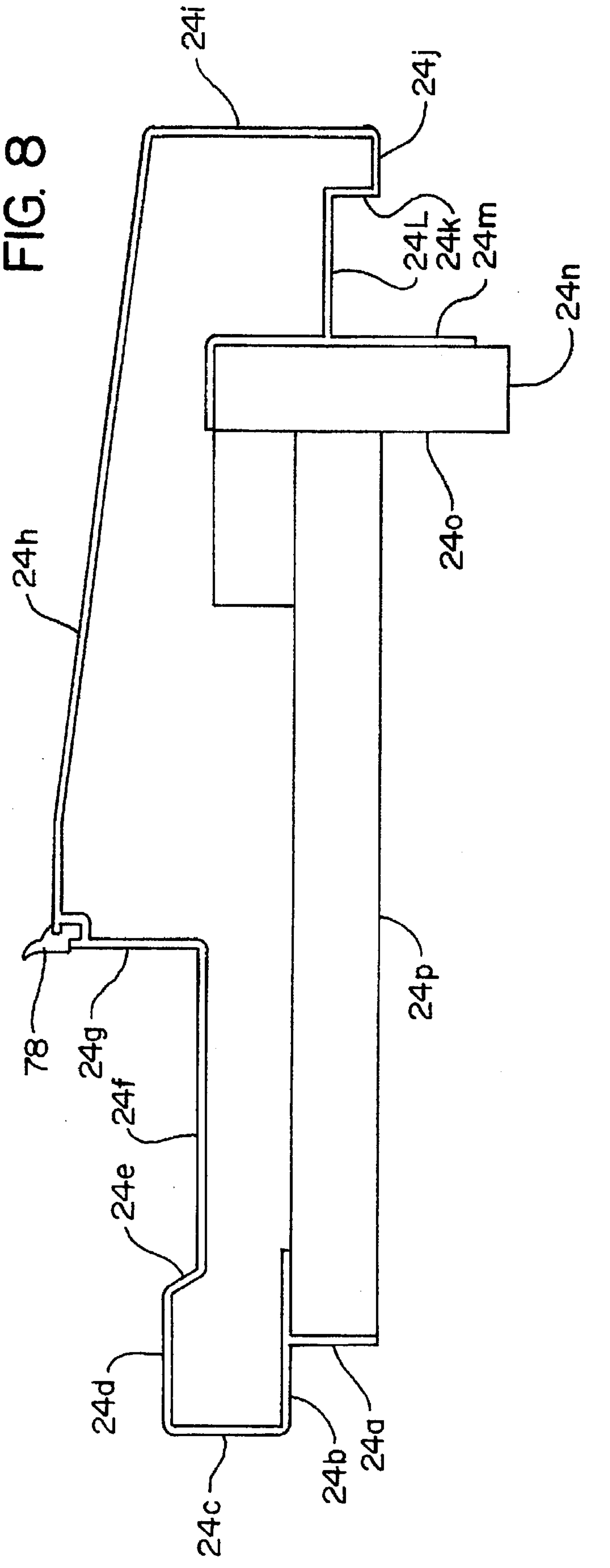
FIG. 8 shows the details of the sash material manufactured by the mold assembly shown in FIG. 7 and used by the window assembly shown in FIG. 1.

Referring now to FIG. 7, shown therein is an apparatus for manufacturing sash material 120 from which the sash 24 is formed. This apparatus basically comprises a two-part mold 122 having a first part 124 connected to a second part 126 by a hinge 128. The hinge 128 allows the second part 126 to rotate about an axis 130 relative to the first part 124.

To manufacture the sash material 120, the cladding 30 is initially extruded in a conventional manner; the cross-sectional shape of the cladding 30 will generally correspond to the cross-sectional shape of the surfaces 24*a*–*m* of the sash 24 as described above. The weather sealing projection 78 is integrally formed with the cladding 30 during the extrusion process. The cladding 30 is preferably formed of 0.047" thick poly vinyl chloride (PVC). Alternatively, the cladding 30 may be formed of pultruded fiberglass reinforced plastic (FRP) having operating characteristics similar to that of the 0.047" PVC cladding.

Further, to facilitate the manufacture of the sash material 120, protrusions 132 and 134 are formed on the cladding 30 during the extrusion process. As will be discussed in further detail below, these protrusions 132 and 134 register the structural assembly 32 relative to the cladding 30 within the mold 122.

The structural assembly 32 is formed by assembling the individual rigid members 38, 40, and 46 together in a generally T-shaped arrangement. These members 38, 40, and 46 are preferably made of oriented-strand board, but can also be comprise particle board, finger jointed board, or plywood, and are preferably glued together to form the assembly 32. The abutting surfaces of these members 38, 40, and 46 may be textured or milled to facilitate the glue bond therebetween.

In some cases, a unitary rigid member made out of a material such as PVC or metal may be used to stiffen the sash material, in which case the term "structural assembly" as employed herein shall be construed to include a single member that achieves the same result as the exemplary structural assembly 32. When metal is used to from the structural assembly 32, metal working tools must be used to cut the sash material 120.

The cladding 30 is then placed into the first portion 124 of the mold 122; the structural assembly 32 is next placed into the mold 122 such that the horizontal rigid member 38 contacts the cladding projection 130 and the vertical rigid member 40 contacts the cladding projection 132. These projections 132 and 134 thus register the structural assembly 32 in the correct orientation with respect to the mold 122 and the cladding 30 therein.

The second mold part 126 is next rotated about the axis 130 into a closed position and locked in the closed position using one or more latches 136 each engaging a hook 138. It should be noted that the second mold part 126 has a recess 140 formed therein to receive the vertical member 40 of the structural assembly 32 that is wider than this vertical member 40; this facilitates rotation of the second mold part 126 about the axis 130 before and after the sash material 120 is formed.

Finally, resin is injected into the mold between the cladding 30 and the structural assembly 32. The resin is then allowed to cure to form the foam core 28. The resin used to form the foam core 28 is a preferably polyurethane foam that acts as a filler and an insulator. As the resin cures, it bonds to the cladding 30 and the structural assembly 32. Accordingly, once the resin cures, the sash material 120 is formed.

The sash material 120 is then cut to the dimensions required for the window assembly 20 and assembled to form the sash 24. The sash material 120 will normally be manufactured in predetermined, convenient lengths and cut as necessary to form a given window assembly. The absence of any metal connectors or fasteners in the material 120 allow the material 120 to be cut like lumber using conventional means.

The resin will normally be injected using an elongate nozzle (not shown) that is inserted into the mold 122 and then is withdrawn from the mold 122 as the resin fills the mold 122. Depending upon the exact dimensions of the sash material 120, the nozzle and mold 122 will be oriented with respect to each other to achieve the best cavity fill.

From the foregoing, it should be apparent that the present invention may be embodied in forms other than described above and still fall within the principles of the present invention. For example, the groove molding 72 and interior molding 88 may be combined into a single molding that will entirely cover the sash 24. This may enhance the aesthetics of the window assembly 20 as installed.

The above-described embodiment is therefore to be considered in all respects illustrative and not restrictive, the scope of the invention being indicated by the appended claims rather than the foregoing description. All changes that come within the meaning and scope of the claims are intended to be embraced therein.

I claim:

1. Sash material to be assembled into a window sash for mounting transparent material within an opening in a building, the opening being defined by inner surfaces of a plurality of sill members, comprising:

a. a rigid structure having an outer surface configured such that the window sash and the transparent material are supported within the opening by the inner surface of at least one of the sill members;

b. a cladding member that engages the rigid structure at first and second locations, the cladding member being formed of cladding material; and c. foam material injected between the structural material and the cladding material to form an insulating foam core, where the structural material and the cladding material are attached to an outer surface of the foam core.

2. Sash material as recited in claim 1, in which the foam material is polyurethane.

3. Sash material as recited in claim 1, in which the cladding material comprises at least one material selected from the group consisting of polyvinyl chloride and fiberglass reinforced plastic.

4. Sash material as recited in claim 1, in which the rigid structural comprises wood.

5. Sash material as recited in claim 1, in which the rigid structural comprises an assembly of wood members.

6. Sash material as recited in claim 1, in which:

a. the rigid structure is attatched to a first portion of the surface of the foam core; and b. the cladding member is attached to a second portion of the outer surface of the foam core and extends over a portion of at least one of the wooden members.

7. Sash material as recited in claim 1, in which the cladding member comprises first and second projections adapted to engage the first and second locations of the rigid structure to register the rigid structure in a correct orientation relative to the cladding member as the foam material is injected between the cladding member and the rigid structure.

8. Sash material as recited in claim 1, in which the surface of the sash material is formed in part by surfaces of the cladding member and in part by surfaces of the rigid structure.

9. Sash material as recited in claim 1, in which the cladding material and rigid structure and contained within a mold as the foam material is injected between the cladding material and the rigid structure.

10. Sash material for forming a window sash for mounting transparent material within an opening in a building, comprising:

a structural assembly comprising a first rigid member and a second rigid member;

a cladding member having a first projection configured to engage the first rigid member and a second projection configured to engage the second rigid member, where the first and second projections maintain the structural member in a desired orientation relative to the cladding member, and where a perimeter of a cross-sectional area of the sash material is formed in part by surfaces on the cladding member and in part by surfaces on the structural member; and foam material injected between the structural assembly and the cladding member to form an insulating foam core; wherein after the sash material is cut and assembled into a window sash in which the transparent material is mounted, the cladding protects the foam core and the structural assembly stiffens the window sash.

11. Sash material as recited in claim 10, in which the foam material is polyurethane.

12. Sash material as recited in claim 10, in which the cladding member made of at least one material selected from the group consisting of polyvinyl chloride and fiberglass reinforced plastic.

13. Sash material as recited in claim 10, in which the first and second rigid members are made of wood.

14. Sash material as recited in claim 10, in which the cladding material and rigid structure and contained within a mold as the foam material is injected between the cladding material and the rigid structure.

* * * * *